(12) United States Patent
Ohnishi

(10) Patent No.: US 8,210,562 B2
(45) Date of Patent: Jul. 3, 2012

(54) CANOPIED FOLDABLE BABY CARRIAGE

(75) Inventor: Ichiro Ohnishi, Nara (JP)

(73) Assignee: Aprica Children's Products Inc., Osaka (JP)

( * ) Notice: Subject to any disclaimer, the term of this patent is extended or adjusted under 35 U.S.C. 154(b) by 270 days.

(21) Appl. No.: 12/288,067

(22) Filed: Oct. 15, 2008

(65) Prior Publication Data

US 2009/0134604 A1    May 28, 2009

(30) Foreign Application Priority Data

Oct. 22, 2007   (JP) ................................ 2007-274138

(51) Int. Cl.
B62B 7/06  (2006.01)

(52) U.S. Cl. ....................................... 280/642; 280/649

(58) Field of Classification Search .................. 280/649, 280/33.992, 33.993, 35, 47.38, 47.41, 32.5, 280/638, 639, 641, 642, 643, 644, 647, 648, 280/650, 655, 657, 658; 296/100.09, 107.02, 296/107.13, 107.14, 163, 187.13, 136.01, 296/136.11
See application file for complete search history.

(56) References Cited

U.S. PATENT DOCUMENTS

| | | | |
|---|---|---|---|
| 1,289,965 A * | 12/1918 | Tichenor | 296/107.02 |
| 1,470,630 A * | 10/1923 | Mahr | 296/107.02 |
| 2,292,132 A * | 8/1942 | Kroll et al. | 280/649 |
| 2,407,779 A * | 9/1946 | Grove | 280/642 |
| 3,390,893 A | 7/1968 | MacLaren | |
| 4,116,465 A * | 9/1978 | Maclaren | 280/647 |
| 4,435,012 A * | 3/1984 | Kassai | 297/354.12 |
| 4,762,335 A | 8/1988 | Kassai | |
| 4,836,573 A * | 6/1989 | Gebhard | 280/644 |
| 4,844,504 A * | 7/1989 | Bigo | 280/642 |
| 4,856,809 A * | 8/1989 | Kohus et al. | 280/644 |
| 5,221,106 A * | 6/1993 | Shamie | 280/644 |
| 5,388,852 A * | 2/1995 | Bigo et al. | 280/642 |
| 5,472,224 A * | 12/1995 | Jane Cabagnero | 280/642 |
| 5,580,072 A * | 12/1996 | Monneret | 280/47.38 |
| 5,669,625 A * | 9/1997 | Jane Cabagnero | 280/647 |
| 5,755,455 A * | 5/1998 | Chen et al. | 280/642 |
| 5,758,889 A * | 6/1998 | Ledakis | 280/47.38 |
| 5,938,230 A * | 8/1999 | Huang et al. | 280/650 |
| 5,979,928 A * | 11/1999 | Kuo | 280/642 |
| 5,988,670 A * | 11/1999 | Song et al. | 280/648 |
| 6,120,041 A * | 9/2000 | Gehr et al. | 280/30 |

(Continued)

FOREIGN PATENT DOCUMENTS

CN   1370707   9/2002

(Continued)

*Primary Examiner* — John R Olszewski
*Assistant Examiner* — Brodie Follman
(74) *Attorney, Agent, or Firm* — Lempia Summerfield Katz LLC

(57) ABSTRACT

A baby carriage includes: a pair of front legs; a pair of connecting members; a pair of guide sleeves respectively fixed to intermediate regions of the pair of front legs; a pair of rear legs having their upper ends pivotally connected to the pair of connecting members, respectively; a pair of push bars sidably held by the pair of connecting members and the pair of guide sleeves, respectively; width-direction connecting means for connecting left and right sides of the baby carriage each formed by each front leg, each rear leg, and each push bar to each other; and a canopy having its both ends in a width direction respectively connected to and held by the pair of push bars at a position lower than the pair of connecting members.

4 Claims, 8 Drawing Sheets

U.S. PATENT DOCUMENTS

| | | | |
|---|---|---|---|
| 6,139,046 A * | 10/2000 | Aalund et al. | 280/642 |
| 6,273,451 B1 * | 8/2001 | Julien et al. | 280/642 |
| 6,276,709 B1 | 8/2001 | Chen et al. | |
| 6,375,213 B1 | 4/2002 | Suzuki | |
| 6,402,225 B1 * | 6/2002 | Hsia | 296/107.02 |
| 6,422,586 B1 * | 7/2002 | Glover | 280/647 |
| 6,428,034 B1 * | 8/2002 | Bost | 280/650 |
| 6,533,311 B2 * | 3/2003 | Kaneko et al. | 280/647 |
| 6,561,536 B2 | 5/2003 | Suzuki | |
| 6,594,840 B2 * | 7/2003 | Tomas et al. | 5/655 |
| D486,428 S * | 2/2004 | Daykin | D12/129 |
| D486,429 S * | 2/2004 | Daykin | D12/129 |
| 6,764,133 B2 * | 7/2004 | Osato | 297/217.4 |
| 6,843,499 B2 * | 1/2005 | Guo | 280/642 |
| 6,910,708 B2 * | 6/2005 | Sack et al. | 280/642 |
| 7,070,197 B2 * | 7/2006 | Chen | 280/642 |
| 7,077,423 B2 * | 7/2006 | Hutchinson | 280/649 |
| D528,948 S * | 9/2006 | Daykin | D12/129 |
| 7,108,275 B2 * | 9/2006 | Yeh et al. | 280/647 |
| 7,118,173 B2 * | 10/2006 | Kassai et al. | 297/184.13 |
| 7,178,822 B2 * | 2/2007 | Chen | 280/642 |
| 7,267,359 B1 * | 9/2007 | Yang et al. | 280/642 |
| 7,396,038 B2 * | 7/2008 | Zweideck | 280/642 |
| 7,434,827 B2 * | 10/2008 | Yeh et al. | 280/642 |
| 7,478,825 B2 * | 1/2009 | Tomasi et al. | 280/642 |
| D587,634 S * | 3/2009 | Myers | D12/129 |
| 7,497,461 B2 * | 3/2009 | Emerson | 280/642 |
| 8,066,300 B2 * | 11/2011 | Ohnishi | 280/647 |
| 2002/0084626 A1 * | 7/2002 | Ageneau | 280/642 |
| 2005/0046152 A1 * | 3/2005 | Hutchinson | 280/642 |
| 2005/0051998 A1 * | 3/2005 | Hsia | 280/642 |
| 2005/0168006 A1 * | 8/2005 | Darland | 296/97.21 |
| 2005/0242535 A1 * | 11/2005 | Chen | 280/47.38 |
| 2005/0242547 A1 * | 11/2005 | Chen | 280/642 |
| 2005/0258619 A1 * | 11/2005 | Zweideck | 280/647 |
| 2005/0258673 A1 * | 11/2005 | Kassai et al. | 297/184.13 |
| 2006/0181040 A1 * | 8/2006 | Dunney et al. | 280/47.38 |
| 2006/0237948 A1 * | 10/2006 | You et al. | 280/642 |
| 2008/0042383 A1 * | 2/2008 | Hu | 280/47.38 |
| 2008/0136212 A1 * | 6/2008 | Yang | 296/100.14 |
| 2008/0150247 A1 * | 6/2008 | Lake | 280/47.41 |
| 2009/0102149 A1 * | 4/2009 | Ohnishi | 280/47.38 |
| 2009/0102163 A1 * | 4/2009 | Ohnishi | 280/649 |
| 2009/0134604 A1 * | 5/2009 | Ohnishi | 280/649 |
| 2009/0267325 A1 * | 10/2009 | Cavins et al. | 280/642 |
| 2009/0302577 A1 * | 12/2009 | Ageneau et al. | 280/642 |
| 2010/0133789 A1 * | 6/2010 | Tanizaki et al. | 280/642 |
| 2010/0171289 A1 * | 7/2010 | Greger et al. | 280/648 |

FOREIGN PATENT DOCUMENTS

| | | | |
|---|---|---|---|
| CN | 2774883 | | 4/2006 |
| DE | 295 20 131 | | 4/1996 |
| DE | 199 19 244 | | 1/2000 |
| EP | 422812 A1 | * | 4/1991 |
| FR | 2 840 371 | | 12/2003 |
| FR | 2 843 357 | | 2/2004 |
| GB | 2033309 A | * | 5/1980 |
| GB | 2 430 413 | | 3/2007 |
| GB | 2459492 A | * | 4/2008 |
| GB | 2459492 | * | 10/2009 |
| JP | 45-13549 | | 6/1970 |
| JP | S52-028849 U | | 2/1977 |
| JP | 7-012824 | | 2/1995 |
| JP | 2001-088709 | | 4/2001 |
| JP | 2001-525291 | | 12/2001 |
| JP | 2005-186904 | | 7/2005 |
| JP | 2005-522372 | | 7/2005 |
| JP | 2006-117010 | | 5/2006 |

* cited by examiner

CANOPIED FOLDABLE BABY CARRIAGE

BACKGROUND OF THE INVENTION

1. Field of the Invention

The present invention generally relates to a baby carriage. More particularly, the present invention relates to a canopied foldable baby carriage that is reduced in size in a height direction when folded.

2. Description of the Background Art

A baby carriage that is reduced in size in height and width directions when folded is disclosed in, for example, Japanese Utility Model Publication No. S45(1970)-13549 of examined applications and Japanese Patent Publication No. H07(1995)-12824 of examined applications. The baby carriages disclosed in these publications are structured so that a pair of push bars extending in an up-down direction are bendable forward to a pair of front legs extending in the up-down direction, whereby the height in the folded state is reduced. The baby carriages are also reduced in size in a width direction when folded. In order to enable such reduction in size in the width direction, a pair of rear legs and the pair of push bars are connected to each other by a back cross member formed by two bar members that cross each other in an X shape.

The baby carriages disclosed in Japanese Utility Model Publication No. S45(1970)-13549 of examined applications and Japanese Patent Publication No. H07(1995)-12824 of examined applications are structured so that the pair of push bars are bendable forward in order to reduce the height in the folded state. Another type of a baby carriage is disclosed in, for example, Japanese National Phase Publication Nos. 2001-525291 and 2005-522372 of PCT applications. In the baby carriages disclosed in these publications, the height in the folded state of the baby carriage is reduced by moving a pair of push bars downward along a pair of front legs.

In the baby carriages disclosed in Japanese Utility Model Publication No. S45(1970)-13549 of examined applications and Japanese Patent Publication No. H07(1995)-12824 of examined applications, an upper part of the back cross member is connected to the back of the pair of push bars. It is therefore difficult to provide a backrest portion located between the pair of push bars in a reclinable manner.

In such a baby carriage having sliding push bars as disclosed in Japanese National Phase Publication Nos. 2001-525291 and 2005-522372 of PCT applications, there is no member that becomes an obstacle on the back of the pair of push bars. It is therefore possible to provide a backrest portion in a reclinable manner. From this standpoint, it can be said that a baby carriage having sliding push bars is preferable.

There are currently many canopied baby carriages on the market. Especially a large, dome-shaped canopy has functions to block the sun, dust, and wind, to adjust brightness, and the like. A dome-shaped canopy is therefore attached to many baby carriages. However, such a large, dome-shaped canopy is not attached to baby carriages that have sliding push bars and are reduced in size in the height direct ion in the folded state, such as those disclosed in Japanese National Phase Publication Nos. 2001-525291 and 2005-522372 of PCT applications. Even if such a canopy is attached, the canopy must be detached from a body frame of the baby carriage when folding the baby carriage.

SUMMARY OF THE INVENTION

It is an object of the present invention to provide a canopied foldable baby carriage which has sliding push bars, is reduced in size in a height direction when folded, and is capable of being reduced in size in the height direction in the folded state even with the canopy kept attached.

A canopied foldable baby carriage according to the present invention is reduced in size in a height direction when folded and includes: a pair of front legs extending in an up-down direction and having front wheels at their respective lower ends; a pair of connecting members respectively fixed to upper ends of the pair of front legs; a pair of guide sleeves respectively fixed to intermediate regions of the pair of front legs; a pair of rear legs extending in the up-down direction, having rear wheels at their respective lower ends, and having their upper ends pivotally connected to the connecting members, respectively; a pair of push bars extending in the up-down direction so as to partially overlap the pair of front legs, and slidably held by the pair of connecting members and the pair of guide sleeves, respectively; width-direction connecting means for connecting left and right sides of the baby carriage each formed by each front leg, each rear leg, and each push bar; and a canopy having its both ends in a width direction respectively connected to and held by the pair of push bars at a position lower than the pair of connecting members.

According to the baby carriage having the above structure, the canopy moves downward together with the push bars in a folding operation of the baby carriage even with the canopy kept attached to a body of the baby carriage. The height of the baby carriage in the folded state can thus be reduced.

In one embodiment, the pair of push bars include a pair of canopy support sleeves fixed at a position lower than the connecting members, respectively. The canopy includes a plurality of canopy ribs pivotally held by the canopy support sleeves, and a canopy cloth provided between the plurality of canopy ribs. Preferably, the canopy has a dome shape and includes on its right and left sides a plurality of canopy ribs having a variable expansion angle therebetween.

DESCRIPTION OF THE PREFERRED EMBODIMENTS

Figure 1:
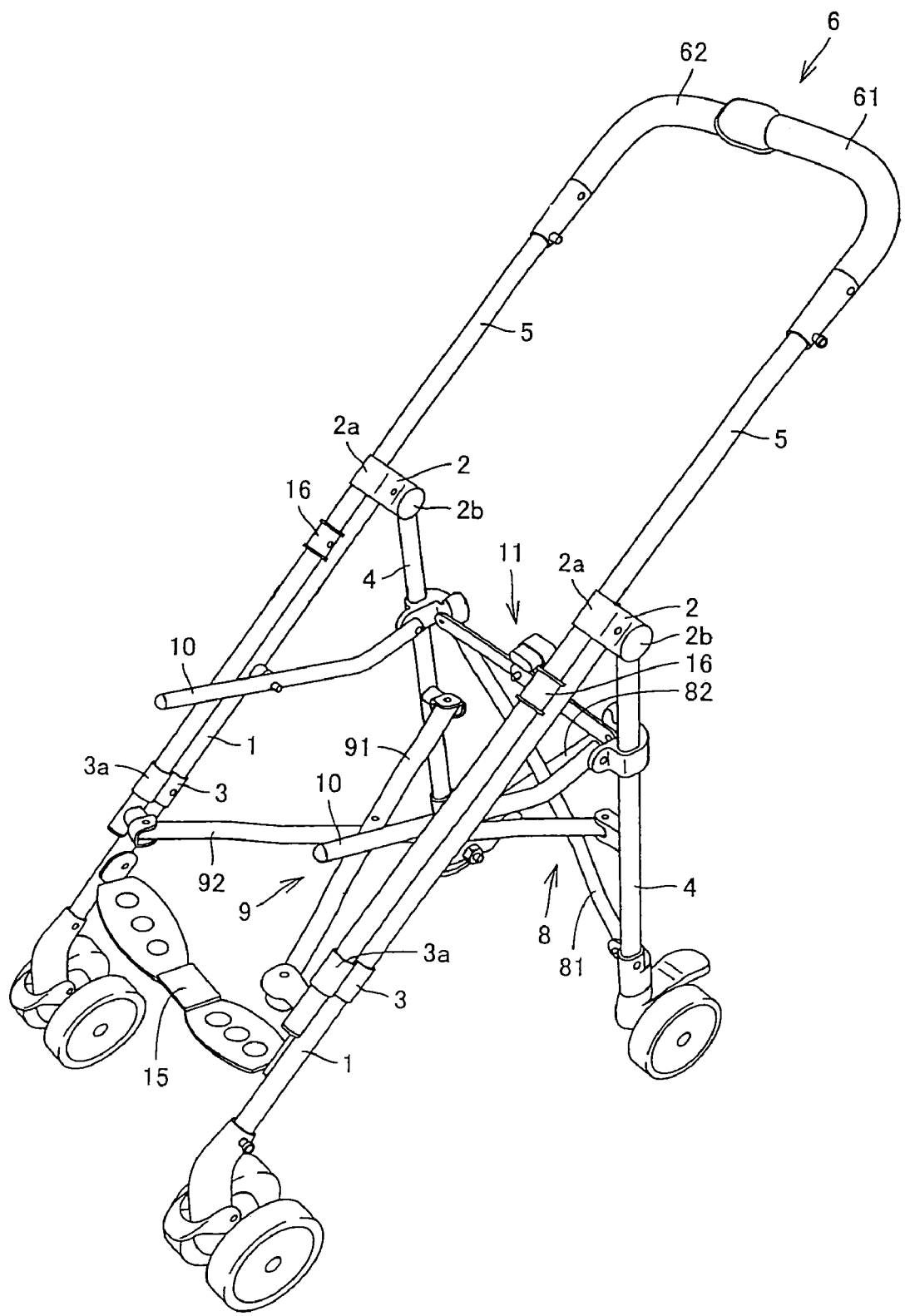
FIG. 1 is a perspective view of a body frame according to an embodiment of the present invention.
Figure 2:
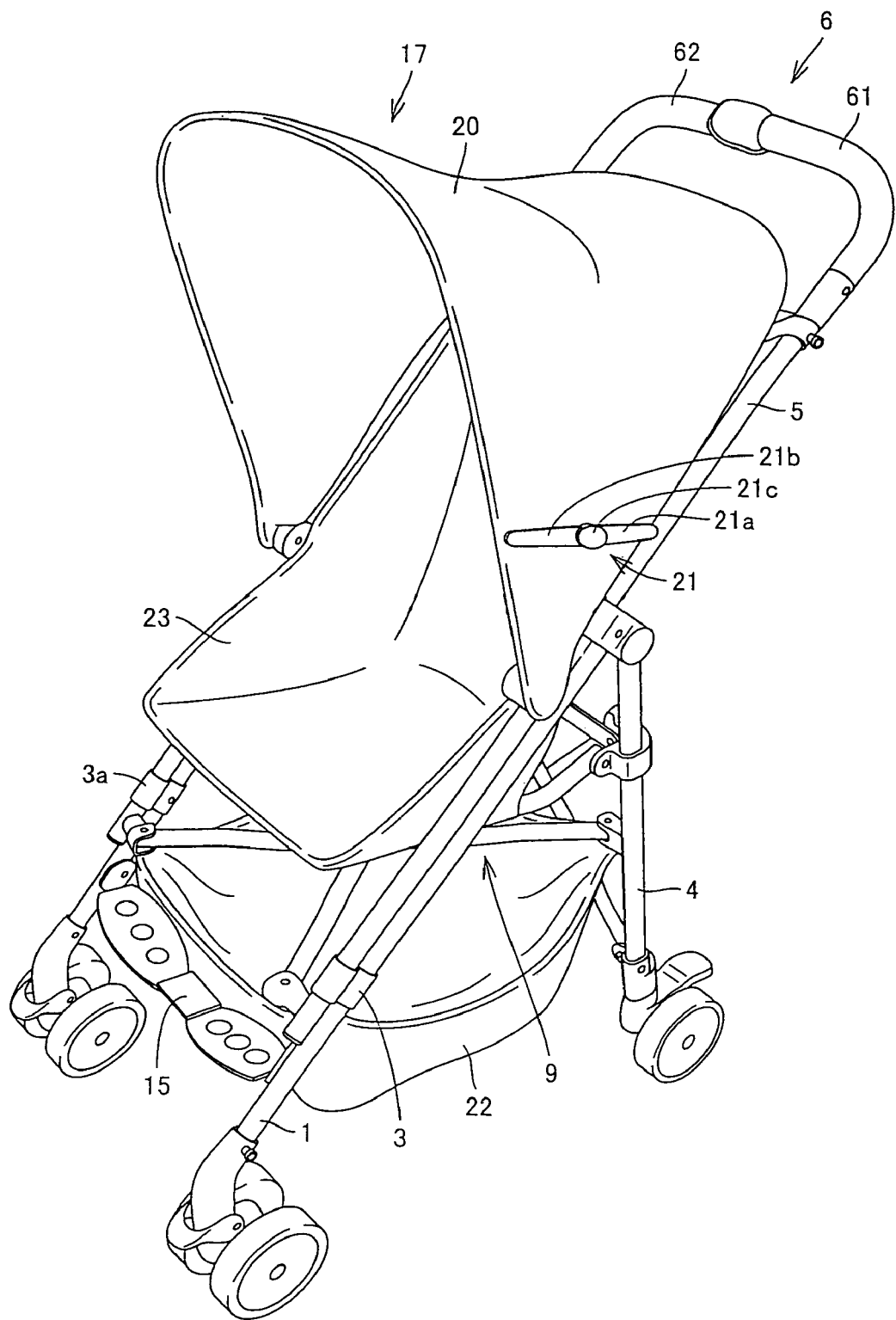
FIG. 2 is a perspective view of a baby carriage according to an embodiment of the present invention.
Figure 3:
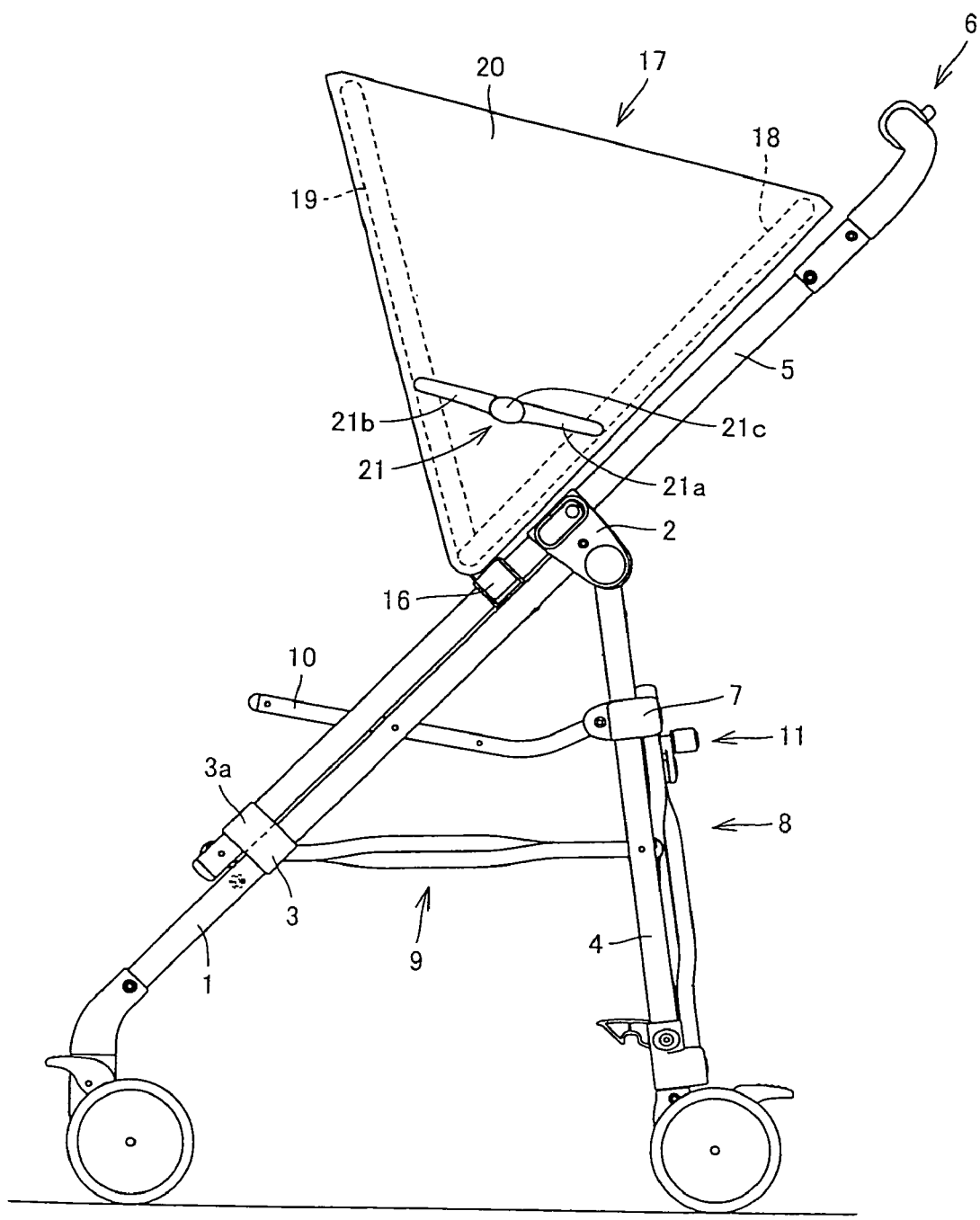
FIG. 3 is a side view of a canopied body frame according to an embodiment of the present invention.
Figure 4:
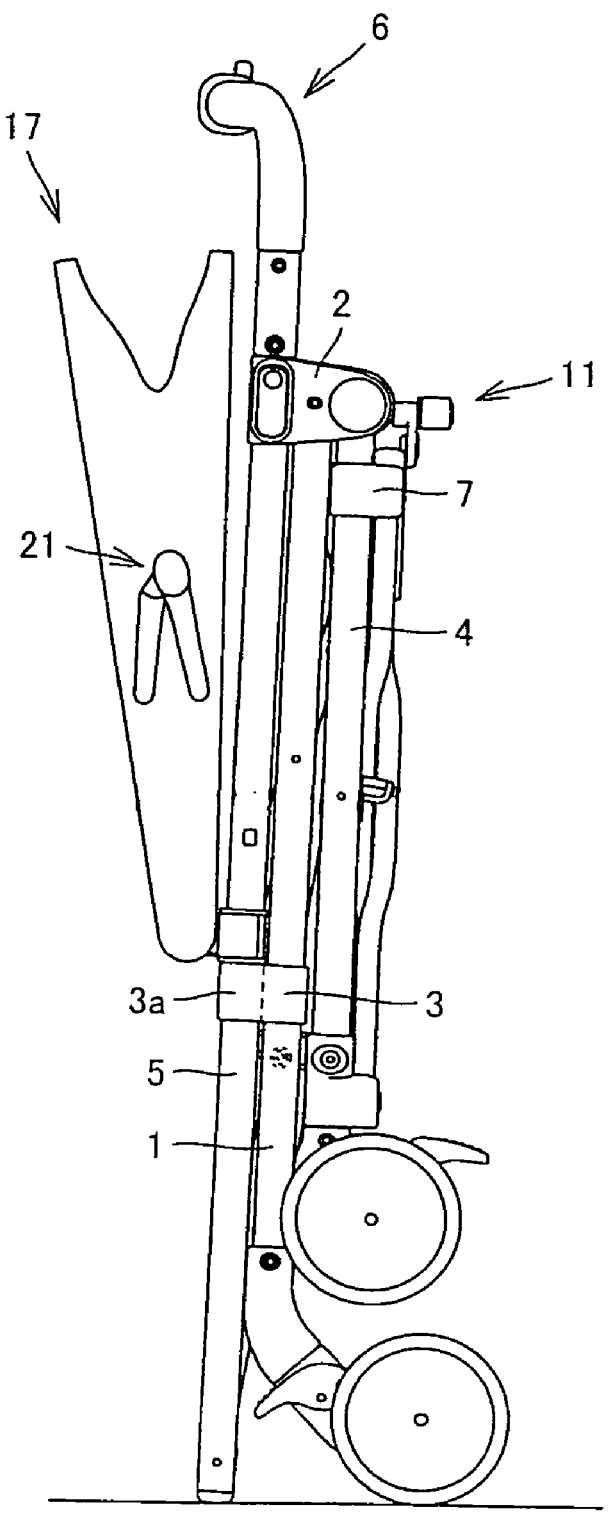
FIG. 4 is a side view showing a folded state of the canopied body frame according to an embodiment of the present invention.

FIGS. 1 through 4 show an overall structure of a foldable baby carriage. FIG. 1 shows a body frame of the baby carriage. FIG. 2 shows the baby carriage having a seat hammock 23, a canopy 17, and a storage bag 22 mounted thereto. FIG. 3 is a side view of the baby carriage in an open state. FIG. 4 is a side view of the baby carriage in a folded state.

The baby carriage is reduced in size in height and width directions when folded. The baby carriage includes, as main components of the body frame, a pair of front legs 1, a pair of rear legs 4, a pair of push bars 5, a handle member 6, a pair of seat support bars 10, a back cross member 8, and a bottom cross member 9.

Each front leg 1 extends in an up-down direction and has a front wheel at its lower end and a connecting member 2 at its upper end. Each connecting member 2 is fixed to the corresponding front leg 1 and has a cylindrical body 2a in its front part and a projecting portion 2b in its rear part. A guide sleeve 3 is fixedly attached to an intermediate region of each front leg 1. Each guide sleeve 3 has a cylindrical body 3a in its front part.

Each rear leg 4 extends in the up-down direction and has a rear wheel at its lower end. An upper end of each rear leg 4 is pivotally connected to the projecting portion 2b of the corresponding connecting member 2 fixed to the corresponding front leg 1. As the baby carriage is folded, each rear leg 4 pivots in a direction approaching the corresponding front leg 1. In the folded state shown in FIG. 4, each rear leg 4 and each front leg 1 are located in parallel with each other, and the rear wheels are located above the front wheels.

Each push bar 5 extends in the up-down direction so that a lower region thereof overlaps the corresponding front leg 1. Each push bar 5 is slidably held by the cylindrical bodies 2a, 3a of the connecting member 2 and the guide sleeve 3 that are fixed to the corresponding front leg 1. As the baby carriage is folded, each push bar 5 slides downwards on the corresponding front leg 1. In the folded state shown in FIG. 1, a lower end of each push bar 5 abuts on the ground. The lower ends of the push bars 5 and the front wheels which are in contact with the ground enable self-standing of the baby carriage in the folded state.

Figure 5:
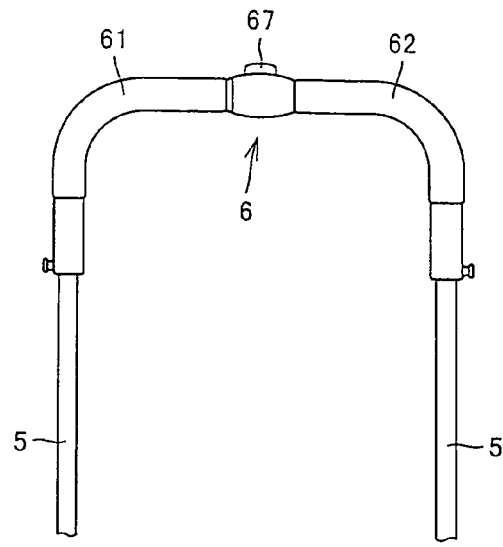
FIG. 5 is a back view of a pair of push bars and a handle member.
Figure 6:
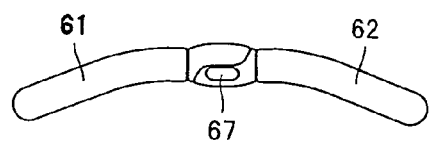
FIG. 6 is a plan view of the handle member.

Respective upper ends of the pair of push bars 5 are connected to each other by the inverted U-shaped handle member 6. As shown in FIGS. 5 and 6, the handle member 6 has an L-shaped first handle arm 61 having its one end fixed to the upper end of one push bar 5 and an L-shaped second handle arm 62 having its one end fixed to the upper end of the other push bar 5. The other end of the first handle arm 61 and the other end of the second handle arm 62 are separably connected to each other by a connecting mechanism. This structure will be described later in more detail with reference mainly to FIGS. 9 to 12.

Figure 7:
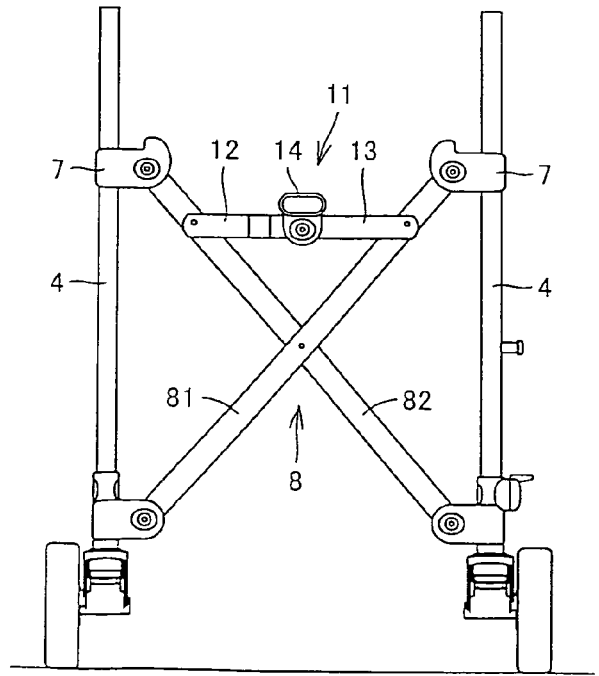
FIG. 7 is a back view of a pair of rear legs and a back cross member.
Figure 8:
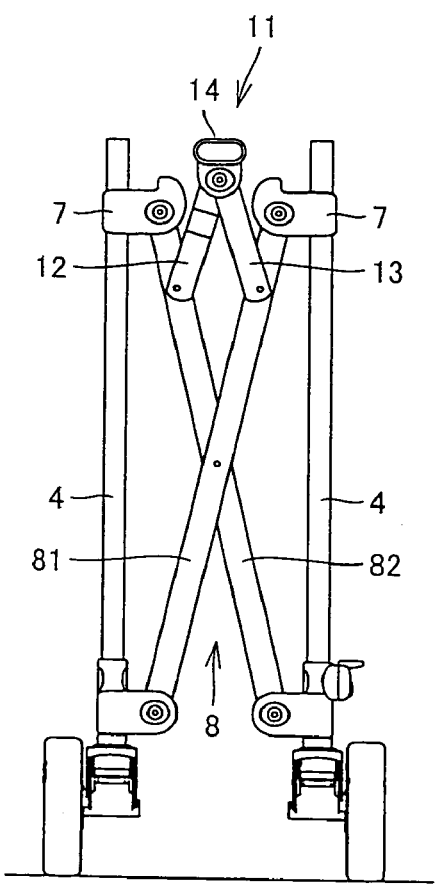
FIG. 8 is a back view of the pair of rear legs and the back cross member in a folded state of the baby carriage.

FIGS. 7 and 8 are back views of the pair of rear legs 4 and the back cross member 8. FIG. 7 shows an open state of the baby carriage and FIG. 8 shows a folded state of the baby carriage. A pair of slide members 7 are slidably provided on upper regions of the pair of rear legs 4, respectively. Each slide member 7 slides upward on the corresponding rear leg 4 as the baby carriage is folded.

The back cross member 8 includes a first bar member 81 and a second bar member 82 which cross each other in an X shape. The first bar member 81 and the second bar member 82 have their upper ends pivotally connected to the pair of slide members 7 and their lower ends pivotally connected to lower regions of the pair of rear legs 4, respectively. The first bar member 81 and the second bar member 82 are pivotally connected to each other at the crossing portion. As can be seen from FIGS. 7 and 8, in the folded state of the baby carriage, the distance between upper and lower ends of the back cross member 8 is longer and the distance between the pair of rear legs 4 is shorter than in the open state of the baby carriage.

As shown in FIGS. 1 and 3, the bottom cross member 9 includes a first bar member 91 and a second bar member 92 which cross each other in an X shape. The first bar member 91 and the second bar member 92 have their front ends pivotally connected to the lower ends of the pair of push bars 5 and their rear ends pivotally connected to intermediate regions of the pair of rear legs 4, respectively. As the baby carriage is folded and the pair of push bars 5 move downwards along the front legs 1, the front ends of the bottom cross member 9 connected to the lower ends of the push bars 5 also move downward accordingly. As a result, the pair of rear legs 4 connected to the rear ends of the bottom cross member 9 are pivoted toward the front legs 1. With increase in the amount of downward movement of the lower ends of the push bars 5, the distance between the front and rear ends of the bottom cross member 9 increases, and the distance between the pair of front legs 1 and the distance between the pair of rear legs 4 therefore decrease.

The pair of seat support bars 10 extend in a front-back direction so as to support a seat portion of the seat hammock 23. The seat support bars 10 has their front or intermediate regions pivotally connected to the pair of front legs 1 and their rear ends pivotally connected to the pair of slide members 7, respectively. As the baby carriage is folded, the slide members 7 move upward on the rear legs 4. As a result, the seat support bars 10 pivot counterclockwise in FIG. 3. In the folded state of the baby carriage, the seat support members 10 are located along the inner side of the front legs 1.

As shown in FIGS. 7 and 8, the back cross member 8 has an open-state lock mechanism 11 for fixing a crossing angle between the first bar member 81 and the second bar member 82 in the open state of the baby carriage. The open-state lock mechanism 11 includes a first link bar 12 having its one end pivotally connected to the second bar member 82, a second link bar 13 having its one end pivotally connected to the first bar member 81, and an operation member 14. In the open state of the baby carriage, the first link bar 12 and the second link bar 13 are fixed at a position slightly beyond a change point, whereby the crossing angle between the first bar member 81 and the second bar member 82 is fixed. In order to fold the baby carriage, the operation member 14 is pulled up with hand so that the first link bar 12 and the second link bar 13 are bent upward.

As shown in FIG. 1, respective lower parts of the pair of front legs 1 are connected to each other by a footrest member 15 that is bendable in the middle. In the open state of the baby carriage, the footrest member 15 extends approximately linearly along the width direction. In the folded state of the baby carriage, on the other hand, the footrest member 15 is bent into a V-shape.

As can be seen from FIG. 3, the canopy 17 has its both ends in the width direction respectively connected to and held by the pair of push bars 5 at a position lower than the pair of connecting members 2. More specifically, each push bar 5 has a canopy support sleeve 16 fixed at a position lower than the respective connecting member 2. The canopy 17 includes canopy ribs 18, 19 pivotally held by the canopy support sleeves 16, and a canopy cloth 20 provided between the plurality of canopy ribs. In the illustrated embodiment, the canopy 17 has a dome shape and includes the first canopy rib 18 and the second canopy rib 19. The first canopy rib 18 and the second canopy rib 19 have such a structure that, or are made of such a material that, can reduce the distance in the width direction when the baby carriage is folded.

In the illustrated embodiment, the canopy 17 includes opening-angle fixing means 21 on its right and left sides for fixing an opening angle between the first canopy rib 18 and the second canopy rib 19. The opening-angle fixing means 21 includes a first link plate 21a having its one end connected to the first canopy rib 18, a second link plate 21b having its one end connected to the second canopy rib 19, and an operation knob 21c for moving the first and second link plates 21a, 21b into a bent position in order to fold the canopy.

The canopy 17 has its both ends respectively supported by the canopy support sleeves 16 fixed to the pair of push bars 5. Therefore, as the baby carriage is folded and the pair of push bars 5 move downward, the canopy 17 also moves downward accordingly. In the folded state of the baby carriage shown in FIG. 4, the canopy 17 is also folded. In the illustrated embodiment, the canopy 17 thus moves downward together with the push bars 5 even with the canopy 17 kept attached to the body of the baby carriage. The height of the baby carriage in the folded state can thus be reduced.

In the baby carriages disclosed in Japanese Utility Model Publication No. S45(1970)-13549 of examined applications and Japanese Patent Publication No. H07(1995)-12824 of examined applications, upper ends of the pair of push bars are free ends. A certain amount of wobbling of the push bars is unavoidable. Such wobbling of the push bars can be reduced by providing a handle member connecting upper ends of the pair of push bars. In this case, in order to reduce the dimension in the width direction in the folded state of the baby carriage, the handle member is typically formed by a plurality of members that are pivotally connected to each other. In this structure, the handle member is bent at the joint between the members, whereby the distance between the pair of push bars is reduced. When such a bendable joint is present, however, the baby carriage becomes shaky at the joint in the open state of the baby carriage. The body frame therefore does not have sufficient rigidity.

In the embodiment of the present invention, the handle member 6 connecting the upper ends of the pair of push bars 5 has a characteristic structure in order to improve the rigidity of the body frame of the baby carriage in the open state. More specifically, in the illustrated embodiment, the first handle arm 61 and the second handle arm 62 of the handle member 6 are separably connected by the connecting mechanism. This structure will be described in detail with reference to FIGS. 9 through 12.

Figure 11:
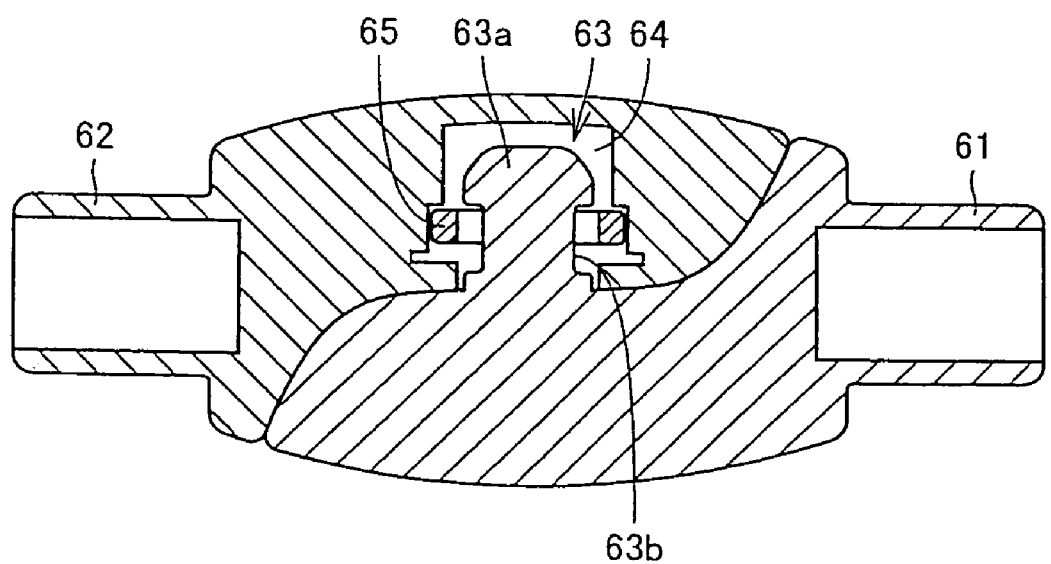
FIG. 11 is a top cross-sectional view of the connecting mechanism.

As shown in FIGS. 6 and 11, an inner end of the first handle arm 61 includes a thinned portion having a reduced thickness, and an inner end of the second handle arm 62 also has a thinned portion having a reduced thickness. These thinned portions are separably connected by the connecting mechanism.

The connecting mechanism includes a fixed shaft 63 fixed to the inner end of the first handle arm 61, a shaft receiving space 64 formed in the inner end of the second handle arm 62 so as to receive the fixed shaft 63, and a lock member 65. The fixed shaft 63 protrudes toward the rear of the baby carriage and includes a head portion 63a having a larger diameter and a neck portion 63b having a smaller diameter.

Figure 9:
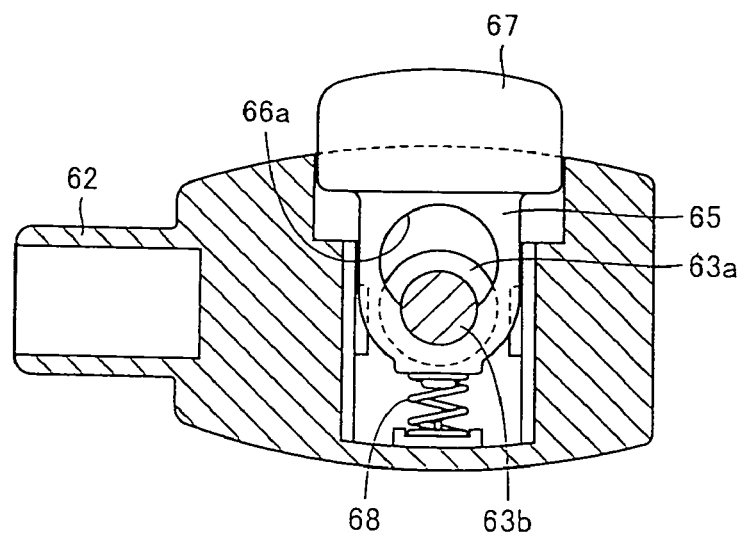
FIG. 9 is a front view of a main part of a connecting mechanism for separably connecting the first handle arm and the second handle arm to each other.
Figure 10:
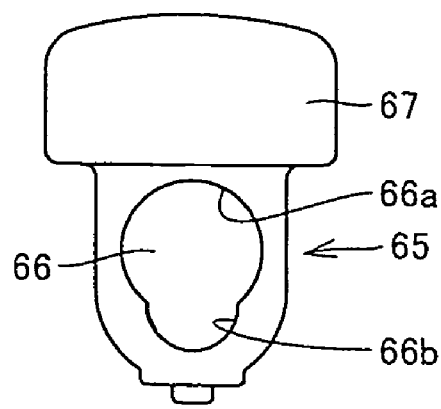
FIG. 10 is a front view of a lock member.

As shown in FIGS. 9 and 10, the lock member 65 has a flat, plate-like shape that is long in the up-down direction, and has a through hole 66 in the middle. The through hole 66 has a large-diameter hole 66a located on the upper side and having a larger diameter, and a small-diameter hole 66b formed so as to overlap a lower part of the large-diameter hole 66a and having a smaller diameter. The diameter of the large-diameter hole 66a is larger than that of the head portion 63a of the fixed shaft 63, and the diameter of the small-diameter hole 66b is smaller than that of the head portion 63a of the fixed shaft 63 and is slightly larger than that of the neck portion 63b.

The lock member 65 is located within the shaft receiving space 64 of the second handle arm 62. The operation member 67 is fixed to an upper end of the lock member 65. The operation member 67 protrudes upward from and is exposed from the top surface of the inner end of the second handle arm 62. As shown in FIG. 9, a biasing member 68 for constantly biasing the lock member 65 upward is provided between a lower end of the lock member 65 and a bottom wall portion of the second handle arm 62. In the illustrated embodiment, the biasing member 68 is a coiled spring.

In the state of FIG. 9, the neck portion 63b of the fixed shaft 63 fixed to the first handle arm 61 fits in the small-diameter hole 66b of the lock member 65 supported by the second handle arm 62. This engaged state is maintained by the biasing force of the biasing member 68. The lock member 65 is interposed between the head portion 63a of the fixed shaft 63 and the first handle arm 61. The first handle arm 61 and the second handle arm 62 are therefore in a fixedly connected state. This state corresponds to the open state of the baby carriage.

Figure 12:
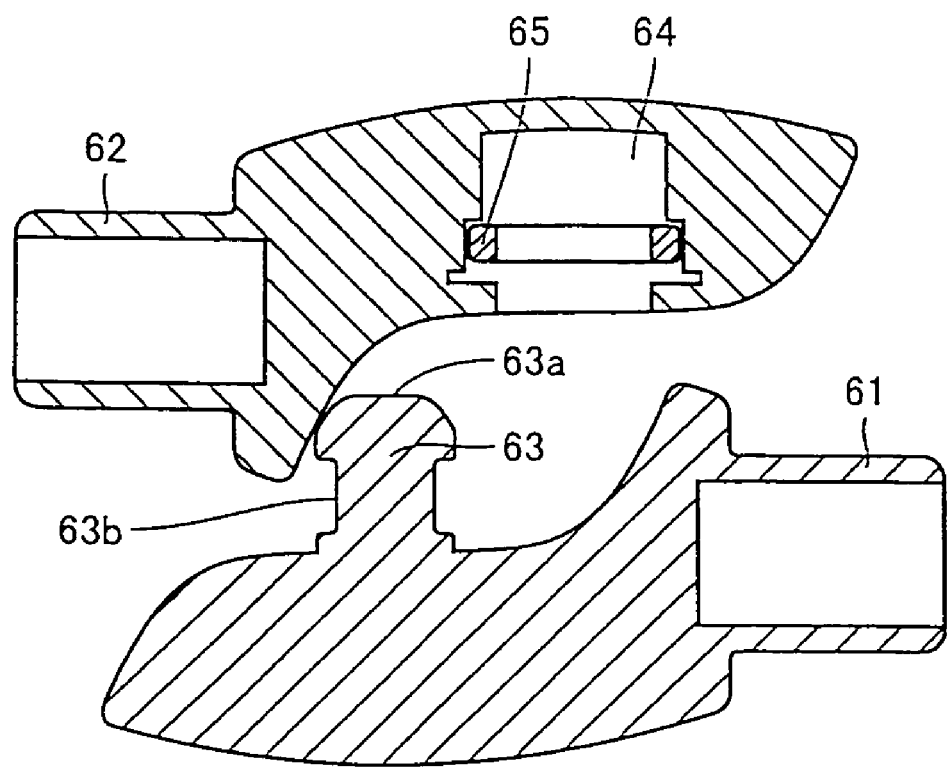
FIG. 12 is a diagram showing a state in which the first handle arm and the second handle arm are separated from each other.

In order to fold the baby carriage, the operation member 67 is pressed down to move the lock member 65 to a lower position. In this position, the large-diameter hole 66a of the lock member 65 is aligned with the head portion 63a of the fixed shaft 63. Accordingly, by moving the inner end of the first handle arm 61 forward relative to the inner end of the second handle arm 62, the head portion 63a of the fixed shaft 63 passes through the large-diameter hole 66a of the lock member 65 and the first handle arm 61 and the second handle arm 62 are separated from each other. FIG. 12 shows a state in which the first handle arm 61 and the second handle arm 62 are separated from each other in the folded state of the baby carriage. Since the distance between the pair of push bars 5 is reduced, the first handle arm 61 moves to the left in the figure and the second handle arm 63 moves to the right in the figure.

The folding operation of the baby carriage will be described step by step. First, the operation member 67 located in the middle of the handle member 6 is pressed down to separate the first handle arm 61 and the second handle arm 62 from each other. The operation member 14 of the open-state lock mechanism 11 attached to the back cross member 8 is then pulled up and finally the pair of push bars 5 are moved downward.

Although an embodiment of the present invention has been described above with reference to the figures, the present invention is not limited to the above described and illustrated embodiment. Various modifications and variations can be made to the above described and illustrated embodiment within the same scope as, or an equivalent scope to, the present invention.

The present invention can be advantageously used in a foldable baby carriage that is reduced in size in height and width direction when folded.

What is claimed is:

1. A canopied foldable baby carriage that is reduced in size in a height direction when folded, comprising:
   a pair of front legs extending in an up-down direction and having front wheels at their respective lower ends;
   a pair of connecting members respectively fixed to upper ends of said pair of front legs;
   a pair of guide sleeves respectively fixed to intermediate regions of said pair of front legs;
   a pair of rear legs extending in the up-down direction, having rear wheels at their respective lower ends, and having their upper ends pivotally connected to said connecting members, respectively;

a pair of push bars extending in the up-down direction so as to partially overlap said pair of front legs, and slidably held by said pair of connecting members and said pair of guide sleeves, respectively;

width-direction connecting means for connecting left and right sides of said baby carriage to each other, each of the left and right sides formed by respective ones of said pair of front legs, said pair of rear legs, and said pair of push bars; and a canopy having its both ends in a width direction respectively fixed to and held by said pair of push bars at a position lower than said pair of connecting members, wherein a pair of canopy support sleeves are fixed to and held by said pair of push bars at a position lower than said pair of connecting members, respectively, and wherein the pair of canopy support sleeves is adjacent the pair of guide sleeves, respectively, when the canopied foldable baby carriage is in a folded configuration.

2. The canopied foldable baby carriage according to claim 1, wherein said canopy includes a plurality of canopy ribs pivotally held by said canopy support sleeves, and a canopy cloth provided between said plurality of canopy ribs.

3. The canopied foldable baby carriage according to claim 2, wherein said canopy has a dome shape and includes on its right and left sides a plurality of canopy ribs having a variable expansion angle therebetween.

4. The canopied foldable baby carriage of claim 1, wherein the pair of canopy support sleeves is configured to slide along the pair of push bars, respectively, from the position lower than the pair of connecting members, respectively, to a position adjacent the pair of guide sleeves, respectively, when the canopied foldable baby carriage is being folded.

* * * * *